June 1, 1954  O. H. GRISWOLD  2,679,670
CARGO GEAR
Filed June 21, 1949  2 Sheets-Sheet 1

INVENTOR.
OWEN H. GRISWOLD
BY
William Iler
ATTORNEY

June 1, 1954 — O. H. GRISWOLD — 2,679,670
CARGO GEAR
Filed June 21, 1949 — 2 Sheets-Sheet 2
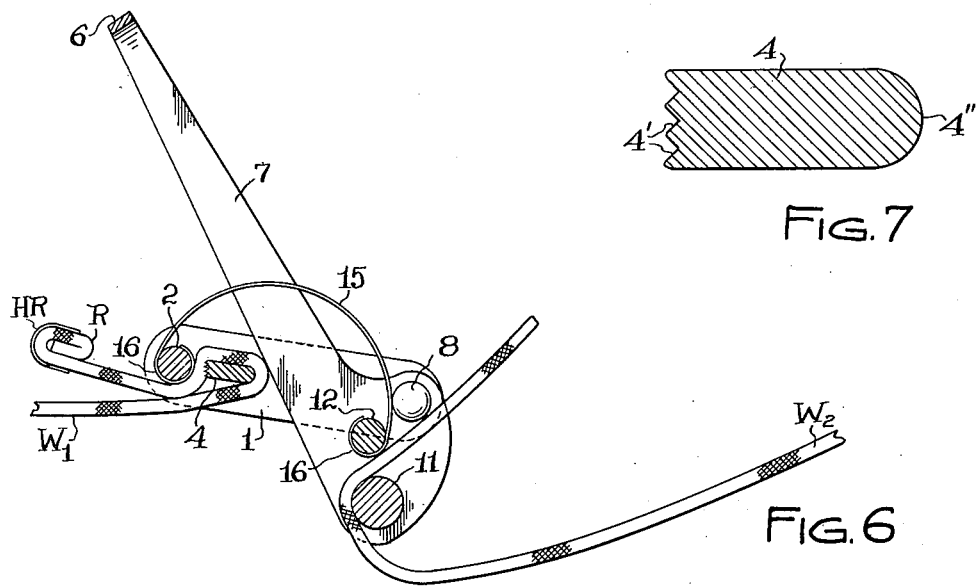
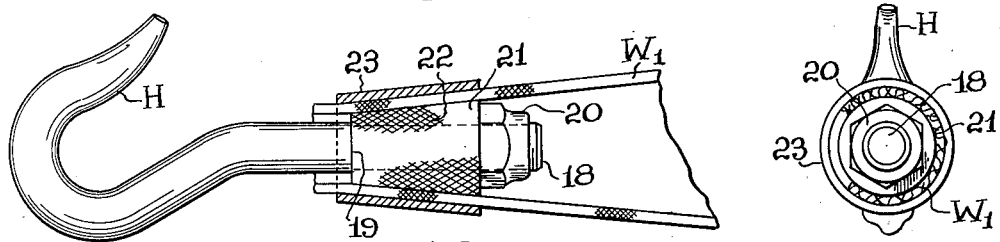 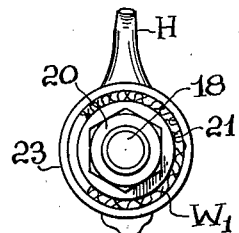
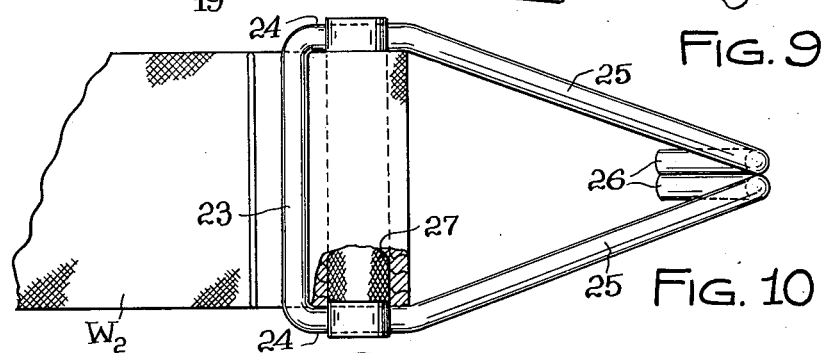
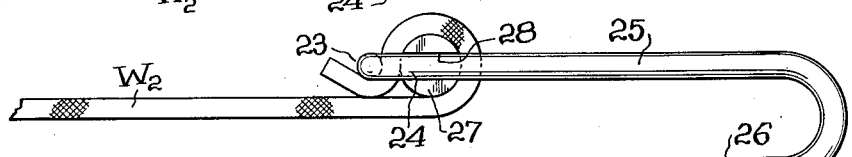
INVENTOR.
OWEN H. GRISWOLD
BY
William Isler
ATTORNEY.

Patented June 1, 1954

2,679,670

UNITED STATES PATENT OFFICE 2,679,670

CARGO GEAR

Owen H. Griswold, Ridgewood, N. J.

Application June 21, 1949, Serial No. 100,439

6 Claims. (Cl. 24—68)

This invention relates to securing means for webbing and more particularly to such securing means as applied to cargo gear.

In the transportation of cargo, particularly by air transport, it is absolutely necessary to avoid any shifting or movement of the cargo. For this purpose, it is customary to use large straps of woven or braided material which are commonly referred to as webbing, which are tied around the crate or other form of freight being transported, in order to immobilize such freight during transportation. The ends of the webbing are usually secured by appropriate means to the surface on which the cargo rests and the free ends of the webbing are secured together by suitable buckles or similar fastening devices.

It is the primary object of the present invention to provide an improved form of cargo gear for the aforesaid purposes.

Another object of the invention is to provide an improved form of fastening means for securing the free ends of the webbing.

Still another object of the invention is to provide such fastening means which will also permit increased tension to be placed on the webbing, thereby assuring immobility of the cargo during transportation.

A still further object of the invention is to provide fastening means in the form of a buckle which has provided thereon means for adjusting the length of each free end of two straps of webbing retained thereon.

Still another object of the present invention is to provide novel means for efficiently securing or connecting the webbing to the surface on which the cargo is disposed.

A still further object of the invention is to provide a fastening device having spring means provided thereon for retaining the locking member in a selected position even when there is no strap tension.

Other objects and advantages of the invention will be apparent during the course of the following description.

In the accompanying drawings, forming a part of this specification, and in which like numerals are employed to designate like parts throughout the same, Fig. 1 shows a conventional cargo or load, showing the use of the cargo gear of the present invention for holding the load against shifting;

Fig. 6 is a view similar to Figs. 4 and 5, but with the buckle in unlocked or fully opened condition;

Fig. 7 is a transverse cross-sectional view of the locking bar;

Fig. 8 is a fragmentary detail view, partly in elevation and partly in section, showing a hook element employed in connection with the cargo gear;

Fig. 9 is an elevational view of the parts shown in Fig. 8, as viewed from the right end of Fig. 8;

Fig. 10 is a view similar to Fig. 8, but showing a modified form of the invention; and Fig. 11 is a side elevational view of the parts shown in Fig. 10.

Figure 1:
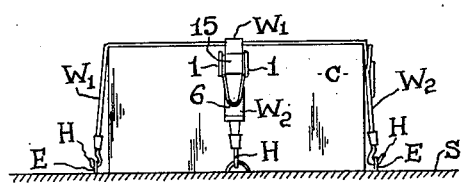
Figure 2:
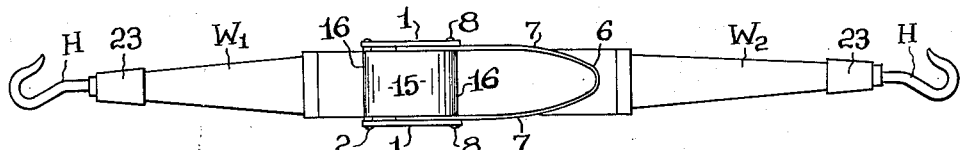
Fig. 2 is a plan view of the cargo gear.
Figure 3:
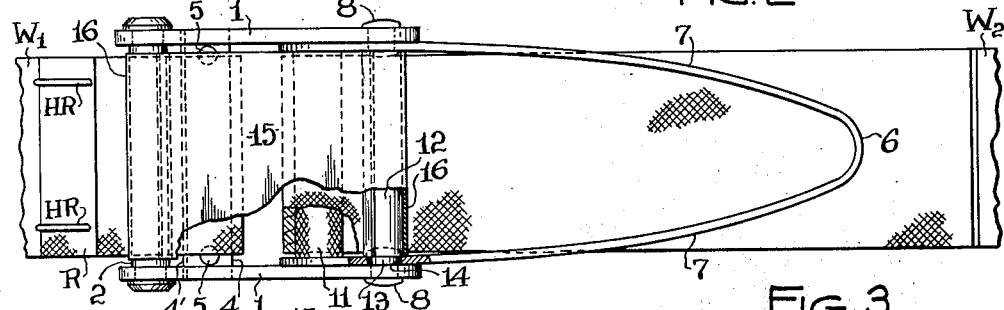
Fig. 3 is a view of a portion of Fig. 2, but enlarged to approximately full size scale, portions being broken away to more clearly show certain details of construction.

Referring more particularly to Figs. 1 to 9 inclusive of the drawings, Fig. 1 shows a conventional cargo or load C, supported on a surface S, and held immovable in relation to said surface by means of hold-down webbing. The webbing is shown as consisting of two parts, designated respectively as $W_1$ and $W_2$. The outer end of each of the webbing parts $W_1$ and $W_2$ is provided with a hook H, these hooks being attached to the webbing in a manner which will be presently described. Each of the hooks H is tethered to an eye-bolt E, which is screwed or otherwise fastened to the surface S.

For the purpose of increasing the tension on the webbing parts, so as to insure against slipping or displacement of the cargo, as well as to maintain the webbing under fairly high tension at all times, means are provided, which will now be described.

Such means, which may be broadly referred to as a buckle, comprises a pair of parallel body bars 1, spaced apart a distance corresponding approximately with the width of the webbing, and maintained in said spaced relationship by means of a spacer bar 2, the ends of which are riveted to the bars 1, adjacent one end of the latter. The bars 1 are also provided with elongated slots 3 which extend generally parallel with the bars. Disposed between the bars 1 is a locking or anchor bar 4, of substantially rectangular cross-section (see Fig. 7), the ends of which are disposed in the slots 3, so that the bar 4 is movable longitudinally along the bars 1, within the limits defined by the ends of the slots 3. One edge of the bar 4 is provided with serrations or teeth 4', and the other edge is rounded as at 4". The bar 4 also has round projections 5 projecting from its upper surface, these projections serving as stops to hold the bar in position transversely of the buckle.

Pivotally secured to the ends of the bars 1 which are remote from the bar 2, is a handle 6, in the form of a U-shaped sheet-metal member, the arms 7 of which are pivotally connected to the bars 1, as by means of rivets 8.

The arms 7 of the handle 6 are provided with semi-circular openings 9 (Fig. 4a) for the reception of the semi-circular ends 10 (Fig. 4) of a round anchor or tension bar 11, the surface of which is knurled. This method of connection of the tension bar 11 to the arms 7 of the handle precludes any possibility of rotation of the tension bar in the handle. A spacer bar or rod 12 is also provided for maintaining the desired spacing between the arms 7 of the handle, this spacer bar being provided with reduced end portions 13 (Fig. 3) which are disposed in circular openings 14 (Figs. 3 and 4a) in the arms 7. The ends 13 of bar 12 are upset after insertion in holes 14 of handle ends 7. This expands ends 13 to provide for a more secure fastening of the handle ends. For mechanical clearance the upset ends are kept flush with the sides of the handle and the effect of this riveting is not apparent in the finished buckle. The handle 6 and the bars 7 form in effect a bell crank.

The buckle further includes, as an optional feature, depending upon the particular application of the cargo gear, an arcuate spring clip or cover 15, the ends 16 of which are curled to embrace the spacer bars 2 and 12 respectively. This spring clip or cover is preferably made from spring tempered stainless steel strip of approximately .010" thickness and serves to secure the handle 6 in locked position, when not in tension.

The inner end of the webbing part $W_1$ is secured to the buckle by curling this end upwardly about the locking bar 4, then passing it down through the space between this locking bar and the spacer bar 2, and then curling the end of the webbing to form a roll R, which may be secured or maintained against unrolling by means of hog rings HR. In this manner, the inner end of the webbing part $W_1$ is prevented from being pulled from the buckle.

The inner end of the webbing part $W_2$ is secured to the buckle by curling this end upwardly about the tension bar 11, then passing it down through the space between this tension bar and the spacer bar 12, permitting the loose end to then overlie the adjacent portion of the webbing part $W_2$. If desired, the free end of the webbing part $W_2$ may also be curled to form a roll, which may be maintained against unrolling by means of hog rings.

As previously stated, the outer end of each of the webbing parts has a hook H secured thereto. For this purpose, each of the hooks H is provided with a threaded shank 18 (Figs. 8 and 9) having a shoulder 19, between which and a nut 20, a sleeve 21 is secured, this sleeve having a conical knurled outer surface 22. Loosely mounted on the sleeve 21 is a conical sleeve 23. The outer end of the webbing part $W_1$ or $W_2$ is curled to conical form and is inserted between the sleeves 21 and 23, so that when tension is applied to the hook, the curled end of the webbing part is firmly gripped between the sleeves.

In Fig. 6 of the drawings, the relative position of the various parts of the buckle and webbing, in the unlocked position of the buckle, or before tension is applied to the webbing, is shown.

Figure 4:
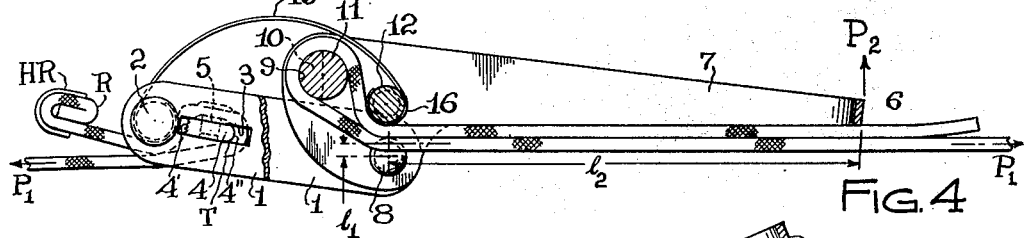
Fig. 4 is a view, partly in elevation and partly in section, of the elements shown in Fig. 3, with the buckle in locked or closed condition.
Figure 4A:
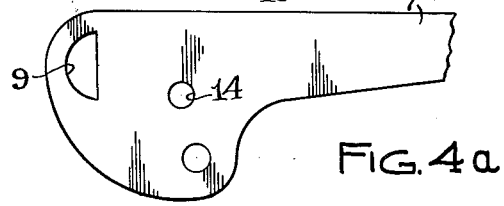
Fig. 4a is a fragmentary side elevational view of one of the handle arms.

The buckle is locked by rotating the handle 6 from the position shown in Fig. 6 to the position shown in Fig. 4, while maintaining a light tension or snubbing force on the free end of the webbing $W_2$. In this latter position, tension is exerted on the webbing, and the buckle will remain locked as long as the webbing is in tension. The amount of initial tension placed on the webbing can be varied, as hereinafter described.

Figure 5:
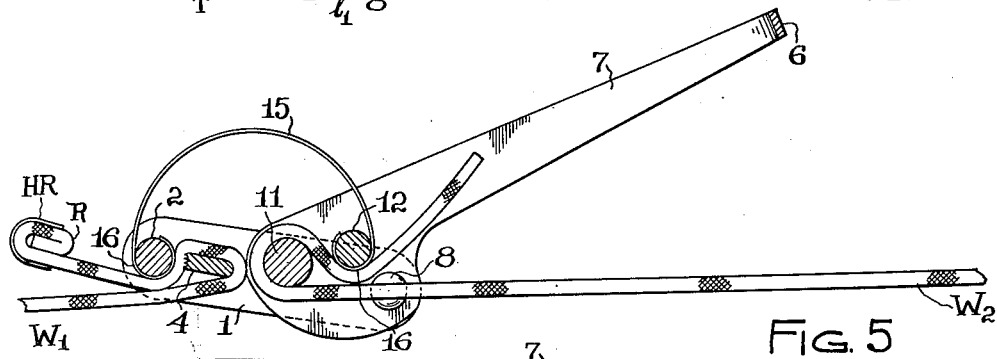
Fig. 5 is a view similar to Fig. 4, but showing the parts in an intermediate position, to which reference will be made in the specification.

In Fig. 5, an intermediate position of the handle and webbing $W_2$ is shown. In this position, the center line of the webbing $W_2$ passes through the pivotal axis or center of the rivets 8, so that this is a position of unstable equilibrium, with reference to the handle. When the webbing is in tension, and the handle is at any position clockwise of the position shown in Fig. 5, the handle will rotate until the closed end of the handle comes into contact with the webbing $W_2$. In this latter position (see Fig. 4), the moment $P_1 l_1 =$ the moment $P_2 l_2$, where $P_1$ is the tension in the webbing and $l_1 =$ the distance from the center line of the webbing to the center of the rivets 8 and the handle is in a state of stable equilibrium. When the handle is at any position counterclockwise of the position of Fig. 5, it will rotate to the fully open position, as shown in Fig. 6, thereby releasing the webbing.

In some uses of the buckle, there may not always be tension on the webbing, and the cover or spring clip 15 functions to secure the handle in the locked position at such time.

The use of the locking bar 4 eliminates the necessity of sewing the webbing $W_1$ to itself at this end of the webbing. The forming of the roll R, and the use of the hog rings HR merely prevent pulling or falling off of the buckle when the buckle is not in use or operation. The locking bar 4 is free to slide along the slots 3, but is torsionally restrained and positioned by the location of the ends of the bar in these slots. When the buckle is being locked, and the webbing is in tension, the bar 4 is pulled toward the spacer bar 2, thus securing the inner end of webbing $W_1$. Friction between the bar 4 and webbing $W_1$ from the center line of the bar 2 through approximately 270° to the "pull-off" point, or point of tangency T (Fig. 4), increases the grip on the webbing and makes for a highly efficient attachment. A major portion of the tensile strength of the webbing is developed by this method of attachment. Moreover, the expense, inconvenience, and inconsistency of sewing is eliminated. Should the webbing become damaged, or if it is desired to make an extra long piece of gear, the gear can be re-webbed in the field without any special tools. Moreover, the position of the buckle with relation to webbing $W_1$ may be adjusted to any position from the rolled end to the hook H. This is particularly desirable, since the buckle could be in an awkward operating position, such as the edge of a box or behind another box, if it were fixed in relation to the webbing $W_1$, as when sewn to the latter.

In cases where the cargo gear can be removed by merely disconnecting the hooks H from the bolts E, a roll similar to R and the use of the hog rings HR will prevent the free end of the webbing $W_2$ from pulling or falling off the buckle when it is not in operation. Moreover, the same procedure of adjusting the position of the buckle in relation to the webbing $W_2$ may also be employed.

The initial tension placed on the webbing can be varied from a small amount to as much as 500 lbs. by the force with which the inner end of the webbing $W_2$ is snubbed over the bar 11 while the handle is rotated. The force of 500 lbs. tension was obtained with an estimated 50 lbs. of snubbing force. Tension and/or snubbing force, as well as the amount of webbing taken up (length that the gear is shortened) can be varied by changing the diameter of the bar 11 and its relation to the pivot axis at the center of rivets 8.

The buckle may be quickly released by pulling either the handle or the free end of webbing part $W_2$. This is an advantage in cargo handling, since it greatly reduces the time spent in unloading the carrier.

Another advantage is the fact that because of its simplified design, the buckle has a greater strength-weight ratio than similar cargo gear now available.

Moreover, the friction grip develops a much higher efficiency in relation to the tensile strength of the webbing than buckles using a clamping action.

In Figs. 10 and 11, a modified form of fitting, designed to be used in place of the hooks H, is shown. The fitting, in this case, is formed from a single piece of wire which is bent to provide a base portion 23a, parallel sides 24, and convergent arms 25, which terminate in hooks 26 in contiguous relation with each other. Disposed within the space between the sides 24 is a knurled locking bar 27 having recesses 28 extending diametrically across the ends thereof, in which recesses the sides 24 are received. The locking bar 27 has a limited sliding movement along the sides 24, and the outer ends of the webbing parts $W_1$ or $W_2$, may be secured to the fitting in the manner shown in Figs. 10 and 11. Tension on the webbing causes the bar 27 to move toward the base 23a of the fitting, thereby firmly locking the webbing to the fitting.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a cargo securing device of the character described, the combination of a body having vertically extending side portions, a bellcrank lever pivotally mounted on said body for movement in a vertical plane, one arm of said lever providing an actuating handle, a horizontal webbing anchor member secured to the other arm of said lever for orbital movement therewith, a cross-bar secured to one arm of said lever in spaced parallel relationship to said anchor member and radially closer to the pivotal axis of said lever whereby to frictionally grip said webbing in response to orbital movement thereof toward said webbing, and resilient means secured to said body and said cross-bar for yieldably maintaining said lever in one or the other of its positions of stable equilibrium.

2. A combination, as defined in claim 1, in which said resilient means comprises a leaf spring.

3. In a cargo securing device of the character described, the combination of a body having means on one end for securing a webbing thereto, the opposite end of said body having tensioning means thereon to secure and tension a webbing thereto, said tensioning means comprising a lever pivotally secured to said body and movable from tensioning to non-tensioning position, a webbing anchor member mounted on said lever and extending transversely of said body on one side of the plane of tension of said webbing when the lever is in tensioning position, said anchor member having a portion of the webbing looped therearound, and means mounted on said lever in spaced parallel relation to said anchor member and intermediate the pivot and said anchor member beneath which said webbing passes, said means lying on the same side of the plane of tension as said anchor member when the lever is in tensioning position, said anchor member and means being movable about said pivot to move said member and means to the opposite side of the plane of tension when the lever is swung to non-tensioning position.

4. A combination as described in claim 3 in which resilient means are secured to said body and said means for yieldably maintaining said lever in one or the other of its positions of stable equilibrium.

5. A combination as defined in claim 4 in which said resilient means comprises a leaf spring.

6. In a cargo securing device of the character described, the combination of a body having securing means at one end thereof, the opposite end of said body having tensioning means thereon to secure and tension a webbing thereto, said tensioning means comprising a lever pivotally secured to said body and movable from tensioning to non-tensioning position, a webbing anchor member mounted on said lever and extending transversely of said body on one side of the plane of tension of said webbing when the lever is in tensioning position, said anchor member having a portion of the webbing looped therearound, and means mounted on said lever in spaced parallel relation to said anchor member and intermediate the pivot and said anchor member beneath which said webbing passes, said means lying on the same side of the plane of tension as said anchor member when the lever is in tensioning position, said anchor member and means being movable about said pivot to move said member and means to the opposite side of the plane of tension when the lever is swung to non-tensioning position.

References Cited in the file of this patent

UNITED STATES PATENTS

| Number | Name | Date |
| --- | --- | --- |
| 163,195 | Hester | May 11, 1875 |
| 206,321 | Heaton | July 23, 1878 |
| 313,628 | Shelby | Mar. 10, 1885 |
| 393,090 | Youmans | Nov. 20, 1888 |
| 565,868 | Washburne | Aug. 11, 1896 |
| 762,857 | Anderson | June 14, 1904 |
| 1,428,560 | Robinson | Sept. 12, 1922 |
| 1,447,967 | Davis | Mar. 13, 1923 |
| 1,547,972 | Spannaus | July 28, 1925 |
| 1,863,021 | Matthes | June 14, 1932 |
| 2,147,706 | Kerr et al. | Feb. 21, 1939 |
| 2,191,228 | Dowd | Feb. 20, 1940 |
| 2,442,266 | Davis | May 25, 1948 |

FOREIGN PATENTS

| Number | Country | Date |
| --- | --- | --- |
| 51,858 | Norway | Dec. 19, 1932 |